March 18, 1958 H. KELLER 2,827,208
DISPENSING APPARATUS
Filed Aug. 31, 1953 2 Sheets-Sheet 2
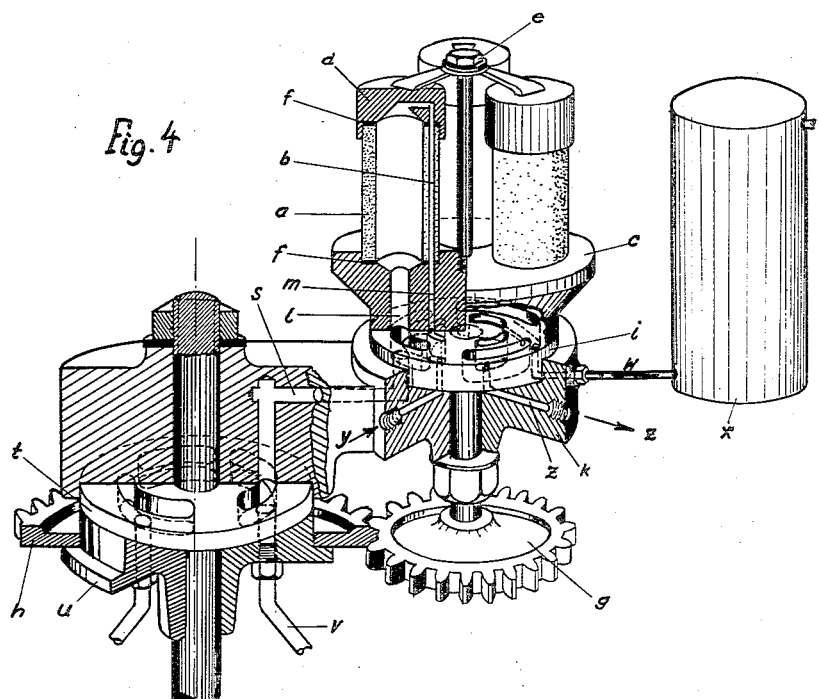
Fig. 4
Fig. 5
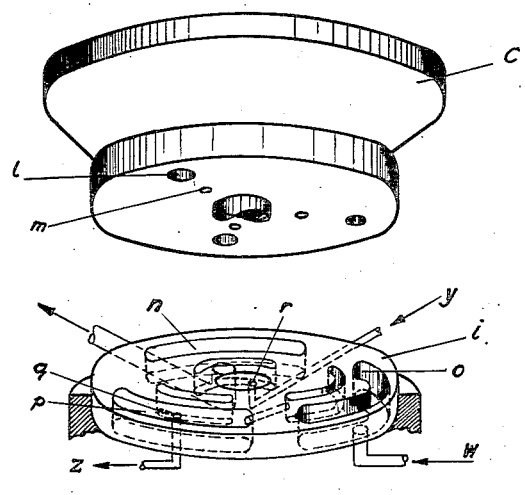
Fig. 6
Inventor
Hans Keller
by Michael S. Striker
agt.

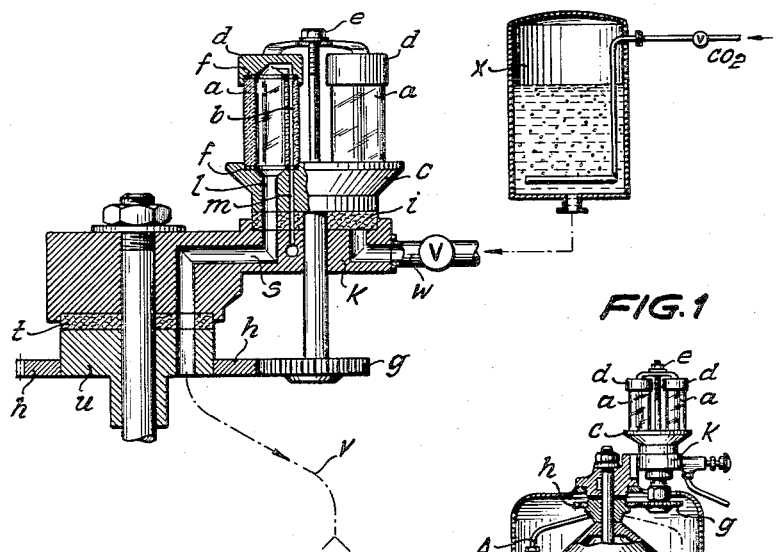
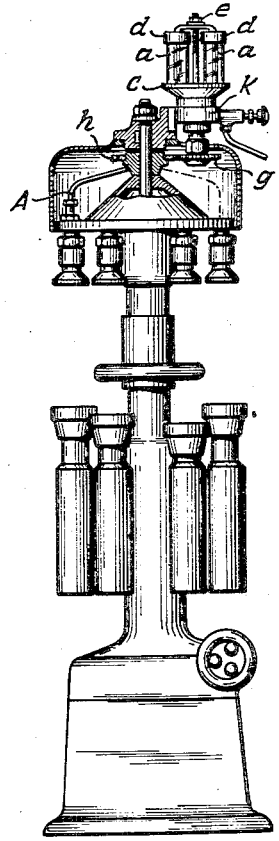
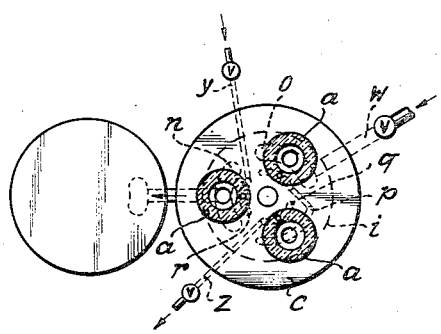
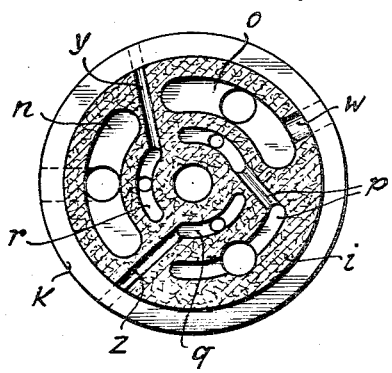

United States Patent Office 2,827,208
Patented Mar. 18, 1958

2,827,208

DISPENSING APPARATUS

Hans Keller, Nurnberg, Germany, assignor to Keller & Romer G. m. b. H., Nurnberg, Germany Application August 31, 1953, Serial No. 377,656

Claims priority, application Germany October 2, 1952

13 Claims. (Cl. 222—332)

The delivery of measured quantities of liquids, particularly as additions to drinks in the case of devices for adding juices, is a problem which it has not hitherto been possible to solve in a satisfactory manner.

Known devices for adding juices have not been able to remedy the various disadvantages and the harm arising therefrom. In almost all such machines the juice reservoir is disposed above the dispensing nozzle and the delivery of the liquid is regulated by a float, which is intended to maintain the quantity delivered constant, provided that the liquid level remains the same. By this means differences in the quantities delivered from time to time are not avoided. The same defects arise when the measured quantities of juice are dispensed by means of pistons or the like. These difficulties have been particularly disadvantageous when operating with thick syrups, as these cling to the piston and to the cylinder walls. These defects make themselves felt all the more since the inaccurate dispensation of the syrup by the hitherto known apparatus makes it very difficult to adhere to the regulations regarding the sugar content of the prepared drinks.

By means of the invention the defects outlined above are overcome, since nearly all elements which are uncertain in operation, such as floats, pumps, measuring pistons and so on are avoided. This is attained in that several measuring vessels are set into rotation, relatively to a device provided with corresponding conduits, by means of gearing in such a way that at each rotation they are consecutively placed in communication with the reservoir, which is under pressure, with a conduit for running off the excess liquid, and with the vessel to be filled.

The dispensing device according to the invention accordingly consists of at least three or even more, preferably transparent cylindrical measuring vessels, or subdivided chambers, having the prescribed capacity, which are mounted in an airtight manner between a base piece, made of metal or a synthetic resin or a ceramic material, and a cover, and are held tightly therebetween by means of screws.

The base member rotates above a fixed leather disc provided with suitable ports, and is driven by a gear wheel from the main shaft. In this way the first vessel is filled from a reservoir, of which the contents are maintained under a light pressure by means of air or some other gas, as soon as the bottom opening of the vessel registers with the corresponding port of the disc leading to the reservoir. As soon as the vessel has been fully charged with the measured quantity, the excess liquid flows away through an overflow passage, formed in the cover and leading downwards inside the vessel; the overflow liquid further flowing into the next measuring vessel through a suitably arranged port in the disc. The overflow passage of this next vessel is in communication with the atmosphere, so that the air from the filled first vessel can escape through the second vessel. Throttling devices may be so arranged in the air outlet passage that the rate of in-flowing liquid can be regulated by the pressure of air.

During the filling of the first vessel and the overflow into the second, the third vessel is over an out-flow port formed in the disc, which port is in communication with another port in the rotating disc driven by the main shaft, and therefore effects the filling of the bottles. In order to accelerate emptying, the overflow passage of the third vessel serves to carry away air or carbon dioxide, which may be under pressure, and which are carried away through a further port in the disc, the emptying of the vessel being thereby effected in the shortest time.

Owing to the positive rotation of the measuring vessels (which are arranged at the side of the main shaft) by means of the gear wheels, the above described process can be repeated as often as required, so that with the arrangement of three vessels or chambers one vessel is always full, then, after the standard level has been reached overflow into the second vessel takes place, while at the same time the third vessel discharges its contents through the outlet nozzle.

Of course, instead of mounting the measuring vessels individually between a cover and a base member, they may be made in one unit and constructed in the form of compartments or cells. Further the measuring vessels may be interchangeable in groups, in order to enable the same apparatus to be used for dispensing or adding different quantities of liquids.

This dispensing apparatus is suitable for all circumstances in which liquids have to be dispensed in exact quantities, or in which exactly measured quantities of liquids have to be charged into relatively large bottles, as, for example, in the lemonade, mineral water, wine and spirit industries, and so on.

An embodiment of the subject of the invention is illustrated in the accompanying drawings, in which:

Figure 1 is a diagrammatic illustration of the complete dispensing machine, the upper driving parts being in section, Figure 2 is a longitudinal section through the dispensing device, Figure 3 is a schematic plan view of the dispensing device, Fig. 4 is a perspective sectional view of the dispensing device, Fig. 4A is a sectional view of the packing and distribution member, Fig. 5 is a perspective view of a detail, and Fig. 6 is a perspectice view of another detail.

Cylindrical measuring vessels $a$, made of transparent or in particular cases of opaque material, and of compartment or cell form, are provided with a transversely and longitudinally extending bore $b$, forming an overflow passage, and are firmly held by means of a screw $e$, between a base member $c$ and a cover $d$, a packing $f$ being interposed. The vessels $a$, together with the base member $c$ are rotated through toothed wheels $g$ and $h$ by the vertical shaft, which is driven by the rotating part of the dispensing machine. The base member $c$ is mounted on a disc $i$, preferably made of leather, and fixed in a stationary moulded member $k$, the disc $i$ serving as a packing member, and also serving for the distribution of the juice and air or carbon dioxide.

As shown in Fig. 5, the base member $c$ is provided with two sets of bores, two bores $l$ and $m$ of unequal diameters for each vessel, of which the larger bore $l$ serves for the supply and dispatch of the juice to the interior of the vessel, while the smaller bore $m$, according to the position of the measuring vessels $a$, serves for the overflow, for carrying away air or carbon dioxide or for communication with the atmosphere. In the fixed leather disk $i$ there are two relatively large ports $n$ and $o$, the large overflow port p and two smaller ports q and r as shown in Fig. 6. During the cycle the bores l and m in the base member pass over the ports n and r in the leather disc i, the length and shape of these ports determining the time of inlet and outlet of syrup, air or carbon dioxide and so on.

In the moulded member k mounted on the main driving shaft there is a bore s, which through a further fixed disc t is in communication with the rotating filling head u, and through bores therein and through a conduit v to the bottle filling mouth v. A further bore w' is also formed in the fixed moulded member k and is in communication with a liquid reservoir x through a filling conduit w. In addition there are formed in the same member k a bore y connected to a gas supply conduit for connection to a source of carbon dioxide or air, as well as a bore z connected to a venting conduit for regulating and throttling the escape of air into the atmosphere from the vessel a when it is being filled by the overflow.

The change of the bottles is effected in the known manner. As, however, in the apparatus according to the invention, owing to the absence of the float device and the valves associated therewith, the whole of the upper part is moved, the pipe A leading from the measuring apparatus to the filling nozzle which was hitherto in the form of a hose can be replaced by tubes, that is to say, rigid members. In this way the occurrence of pockets of liquid differences in the quantities delivered and the generation of bacteria in crevices in the hose are avoided, and a constant outflow is assured.

The gear ratio between the two toothed wheels g and h is determined by the number of filling stations, for example, in the case of a filling machine having six stations and a dispensing device having three stations the speed of rotation of the dispensing device must be twice that of the filling machine. The length of the connecting pipe depends upon the position of the apparatus, but can be kept considerably shorter than in cases where a pump or a float and so on are present. Above all, an exact and always constant quantity of fluid is attained, while at the same time the supervision of the operation is simple, and a saving of power is obtained.

What I claim is:

1. Dispensing apparatus comprising, in combination, means forming a predetermined path for a plurality of vessels to be moved along said path in a predetermined direction; filling means arranged at a filling point along said path for filling a first vessel located at said filling point; overflow conduit means connecting said filling point with an overflow point along said path and spaced from said filling point in an opposite direction for guiding fluid overflowing from the first vessel located at said filling point to a second vessel located at said overflow point; venting conduit means connected to said overflow point for venting the second vessel to atmosphere; and dispensing means arranged at a dispensing point along said path and spaced from said first point in said predetermined direction for dispensing fluid from a third vessel located at said dispensing point.

2. Dispensing apparatus comprising, in combination, means forming a predetermined path for a plurality of vessels to be moved along said path in a predetermined direction; filling means arranged at a filling point along said path for filling a first vessel located at said filling point; overflow conduit means connecting said filling point with an overflow point along said path and spaced from said filling point in an opposite direction for guiding fluid overflowing from the first vessel located at said filling point to a second vessel located at said overflow point; venting conduit means connected to said overflow point for venting the second vessel to atmosphere; control means connected to said venting conduit means for controlling the rate of gaseous flow therethrough; and dispensing means arranged at a dispensing point along said path and spaced from said first point in said predetermined direction for dispensing fluid from a third vessel located at said dispensing point.

3. Dispensing apparatus comprising, in combination, means forming a predetermined path for a plurality of vessels to be moved along said path in a predetermined direction; filling means arranged at a filling point along said path for filling a first vessel located at said filling point; overflow conduit means connecting said filling point with an overflow point along said path and spaced from said filling point in an opposite direction for guiding fluid overflowing from the first vessel located at said filling point to a second vessel located at said overflow point; dispensing means arranged at a dispensing point along said path and spaced from said first point in said predetermined direction for dispensing fluid from a third vessel located at said dispensing point; and gas supplying conduit means connected to said dispensing point for placing the third vessel in communication with a gas supply.

4. Dispensing apparatus comprising, in combination, means for forming a predetermined path for a plurality of vessels having, respectively, combined filling and discharge opening means and overflow opening means and to be moved along said path in a predetermined direction; filling means arranged at a filling point along said path for filling a first vessel located at said filling point, said filling means including filling conduit means adapted to communicate with the combined filling and discharge opening means for the first vessel and with a source of liquid to be filled into the first vessel; overflow conduit means connecting said filling point with an overflow point along said path and spaced from said filling point in an opposite direction for guiding liquid overflowing from the first vessel located at said filling point to a second vessel located at said overflow points, said overflow conduit means being adapted to communicate with the overflow opening means of the first vessel and the combined filling and discharge opening means of the second vessel; venting conduit means connected to said overflow point for venting the second vessel to atmosphere, said venting conduit means being adapted to communicate with the overflow opening means of the second vessel and with atmosphere; dispensing means arranged at a dispensing point along said path and spaced from said first point in said predetermined direction for dispensing liquid from a third vessel located at said dispensing point, said dispensing means including discharge conduit means adapted to communicate with the combined filling and discharge opening means of the third vessel; and gas supplying conduit means connected to said dispensing point for placing the third vessel in communication with a gas supply, said gas supplying conduit means being adapted to communicate with the overflow opening means of the third vessel and with the gas supply.

5. Dispensing apparatus comprising, in combination, means for forming a predetermined circular path for a plurality of vessels having, respectively, combined filling and discharge opening means and overflow opening means and to be moved along said path in a predetermined direction; gear-driven moving means for moving the plurality of vessels along said path in said predetermined direction; filling means arranged at a filling point along said path for filling a first vessel located at said filling point, said filling means including filling conduit means adapted to communicate with the combined filling and discharge opening means of the first vessel and with a source of liquid to be filled into the first vessel; overflow conduit means connecting said filling point with an overflow point along said path and spaced from said filling point in an opposite direction for guiding liquid overflowing from the first vessel located at said filling point to a second vessel located at said overflow points, said overflow conduit means being adapted to communicate with the overflow opening means of the first vessel and the combined filling and discharge opening means of the second vessel; venting conduit means connected to said overflow point for venting the second vessel to atmosphere, said venting conduit means being adapted to communicate with the overflow opening means of the second vessel and with atmosphere; dispensing means arranged at a dispensing point along said path and spaced from said first point in said predetermined direction for dispensing liquid from a third vessel located at said dispensing point, said filling, overflow, and dispensing points being spaced equidistant from each other, said dispensing means including discharge conduit means adapted to communicate with the combined filling and discharge opening means of the third vessel; and gas supplying conduit means connected to said dispensing point for placing the third vessel in communication with a gas supply, said gas supplying conduit means being adapted to communicate with the overflow opening means of the third vessel and with the gas supply.

6. Dispensing apparatus comprising, in combination, means forming a predetermined path for a plurality of vessels to be moved along said path in a predetermined direction; filling means arranged at a filling point along said path for filling a first vessel located at said filling point; overflow conduit means connecting said filling point with an overflow point along said path and spaced from said filling point in an opposite direction for guiding fluid overflowing from the first vessel located at said filling point to a second vessel located at said overflow point; venting conduit means connected to said overflow point for venting the second vessel to atmosphere; dispensing means arranged at a dispensing point along said path and spaced from said filling point in said predetermined direction for dispensing fluid from a third vessel located at said dispensing point; and gas supply conduit means connected to said dispensing point for placing the third vessel in communication with a gas supply.

7. Apparatus for dispensing measured quantities of a liquid, and comprising, in combination, a rotary member including a set of measuring vessels having overflow passages, and a base member fluid-tightly engaging said measuring vessels and having a set of first bores communicating with the interiors of said vessels and a set of second bores communicating with said overflow passages respectively; a stationary disc member fluid-tightly engaging said base member, said disc member being formed with a set of first ports communicating with said first bores in said base member during rotation of said rotary member, and a set of second ports communicating with said second bores of said base member during rotation of said rotary member, said disc member having a connecting passage connecting one of the second ports adapted to communicate with a leading vessel with a first port communicating with another of said vessels trailing said leading vessel in direction of rotation; filling conduit means communicating with the first port associated with said leading vessel; and venting conduit means communicating with the second port associated with said other trailing vessel whereby a liquid filled by said filling means into said leading vessel overflows through the overflow passage in said leading vessel and said connecting conduit into said trailing vessel, said trailing vessel being vented through said overflow passage thereof and through said second bore and second port communicating therewith.

8. Apparatus for dispensing measured quantities of a liquid, and comprising, in combination, a rotary member including a set of measuring vessels having overflow passages, and a base member fluid-tightly engaging said measuring vessels and having a set of first bores communicating with the interiors of said vessels and a set of second bores communicating with said overflow passages respectively; a stationary disc member fluid-tightly engaging said base member, said disc member being formed with a set of first ports communicating with said first bores in said base member during rotation of said rotary member, and a set of second ports communicating with said second bores of said base member during rotation of said rotary member, said disc member having a connecting passage connecting one of the second ports adapted to communicate with a leading vessel with a first port communicating with another of said vessels trailing said leading vessel in direction of rotation; filling conduit means communicating with the first port associated with said leading vessel; venting conduit means communicating with the second port associated with said other trailing vessel whereby a liquid filled by said filling means into said leading vessel overflows through the overflow passage in said leading vessel and said connecting conduit into said trailing vessel, said trailing vessel being vented through said overflow passage thereof and through said second bore and second port communicating therewith; discharge conduit means communicating with a further port of said first ports for discharging liquid from a vessel leading said leading vessel; and gas supply conduit means communicating with the second port associated with said further first port whereby liquid from said last mentioned leading vessel is discharged from said discharge conduit means under the pressure of gas supplied thereto through said gas supply conduit means.

9. A dispensing apparatus as set forth in claim 7 including control means located in said venting conduit means for regulating the escape of air from said trailing vessel.

10. A dispensing apparatus as set forth in claim 7 wherein said rotary member includes a set of adjustable cover members respectively associated with said measuring vessels, each of said measuring vessels having one open end closed by said base member, and another open end closed by one of said cover members; and means for retracting and advancing said cover members with respect to said other open ends of said measuring vessels for replacing said measuring vessels with measuring vessels of different volume.

11. A dispensing apparatus as set forth in claim 8 and including a distributing member formed with a plurality of passages constituting portions of said filling conduit means, venting conduit means, dispensing conduit means and gas supply conduit means and being located on the side of said disc member remote from said base member and fluid tightly engaging said disc.

12. A dispensing apparatus as set forth in claim 11 wherein said disc and said distributing member are formed with aligned bores; and including a drive shaft passing through said aligned bores and connected to said rotary member for rotating the same.

13. A dispensing apparatus as set forth in claim 12 and including a rotary dispensing member engaging said distributing member and having a passage for filling bottles, said passage communicating with said discharge conduit means; and transmission means connecting said drive shaft with said rotary member.

References Cited in the file of this patent

UNITED STATES PATENTS

| | | |
|---|---|---|
| 1,527,406 | Hansen | Feb. 24, 1925 |
| 2,567,052 | Carruthers | Sept. 4, 1951 |
| 2,663,482 | Gilberty | Dec. 22, 1953 |
| 2,665,046 | Rogers et al. | Jan. 5, 1954 |